United States Patent

Metzler et al.

(10) Patent No.: US 8,695,752 B2
(45) Date of Patent: Apr. 15, 2014

(54) FILMS AND MEMBRANES FOR ACOUSTIC SIGNAL CONVERTER

(75) Inventors: Kerstin Metzler, Chêne-Bourg (CH); Bernhard Müssig, Seevetal (DE); Frank Virus, Hamburg (DE)

(73) Assignee: tesa SE, Hamburg (DE)

( * ) Notice: Subject to any disclaimer, the term of this patent is extended or adjusted under 35 U.S.C. 154(b) by 328 days.

(21) Appl. No.: 13/143,982

(22) PCT Filed: Jan. 28, 2010

(86) PCT No.: PCT/EP2010/050984
§ 371 (c)(1),
(2), (4) Date: Sep. 8, 2011

(87) PCT Pub. No.: WO2010/091960
PCT Pub. Date: Aug. 19, 2010

(65) Prior Publication Data
US 2012/0002833 A1    Jan. 5, 2012

(30) Foreign Application Priority Data
Feb. 10, 2009   (DE) .......... 10 2009 008 323

(51) Int. Cl.
*G10K 13/00*   (2006.01)
*C08G 63/00*   (2006.01)

(52) U.S. Cl.
USPC ........... 181/157; 528/153; 528/155; 528/176

(58) Field of Classification Search
USPC .......................... 181/157; 528/153, 155, 176
See application file for complete search history.

(56) References Cited

U.S. PATENT DOCUMENTS

| | | | |
|---|---|---|---|
| 5,104,723 A | 4/1992 | Freitag et al. | |
| 5,847,332 A | 12/1998 | Faraone | |
| 2005/0221106 A1* | 10/2005 | Nick et al. | 428/501 |

FOREIGN PATENT DOCUMENTS

| | | |
|---|---|---|
| EP | 0 362 646 A2 | 4/1990 |
| EP | 1 457 792 A1 | 9/2004 |
| JP | 7 216076 A | 8/1995 |
| JP | 11 205894 A | 7/1999 |
| JP | 2000 147202 A | 5/2000 |
| JP | 2002 044781 A | 2/2002 |
| WO | 2004/003062 A | 1/2004 |

OTHER PUBLICATIONS

International Search Report Dated Jul. 30, 2010.

* cited by examiner

*Primary Examiner* — Ling Choi
*Assistant Examiner* — Gennadiy Mesh
(74) *Attorney, Agent, or Firm* — Norris McLaughlin & Marcus PA

(57) ABSTRACT

Deep-drawn membranes formed of polyester or polycarbonate films, comprising units of Formula (I) and (II), useful for acoustic signal converters as microphones and speakers. The film can be produced by thermoplastic processes or solvent cast processes. Especially suitable for the production of small membranes with a diameter of up to 10 cm useful in mobile devices as microphones, mobile telephones, laptops, personal digital assistants (PDAs), headphones or as signal transmitters

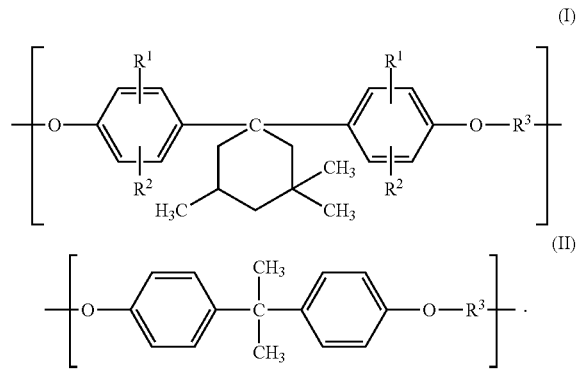

11 Claims, No Drawings

FILMS AND MEMBRANES FOR ACOUSTIC SIGNAL CONVERTER

This is a 371 of PCT/EP2010/050984 filed 28 Jan. 2010 (international filing date), and claiming priority of German Application 10 2009 008 323.5, filed Feb. 10, 2009.

The invention relates to films and membranes produced therefrom for acoustic signal converters made from a polyester containing the structural unit of the formula (I):

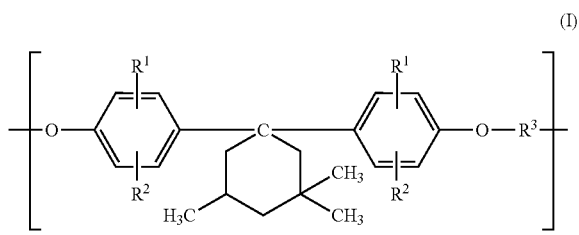

(I)

wherein $R^1$ and $R^2$ independently of each other represent halogen, C1-C8 alkyl, C5-C6 cycloalkyl, C6-C10 aryl, C7-C12 aralkyl or preferably hydrogen and $R^3$ either corresponds to the following formula (A) or preferably is a carbonyl group.

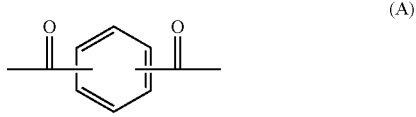

(A)

The film according to the invention can be produced by thermoplastic processes or preferably as a solvent cast film. It is preferably deep-drawn to a membrane for acoustic signal converters such as a microphone or loudspeakers. For the production of small membranes with a diameter of up to ca. 10 cm for acoustic signal converters for use in mobile devices such as microphones, mobile telephones, laptops, personal digital assistants (PDAs), headphones or as signal transmitters for example in automobiles, stretched polyester films (PET, PEN) have until now been used, and films of bisphenol A polycarbonate (PC) for high grade applications. The construction of such membranes from PC is described in JP 2002044781 A and JP 11205894 A.

In order to reduce the oscillating mass of the membranes, ensure exact formation of embossed structures during the deep-drawing and to enable further miniaturization, the membranes should be as thin as possible. Films of said plastics are mechanically very durable, but have the disadvantage that during use as loudspeaker membranes they create a "metallic" tone or cannot be adequately shaped for the formation of complicated embossed structures, since the orientation through the extrusion process leads to anisotropic shrinkage. As a consequence thereof, acoustic signals, in particular music and/or speech signals, are adversely altered during the conversion into electrical signals and vice versa. The production of small microphone and loudspeaker membranes for the aforesaid application fields is usually effected in deep-drawing processes. In these, the film is heated to soften it before the deep-drawing, for example by irradiation with infrared light. Because of anisotropic shrinkage, uniform heating of particularly thin films before the deep-drawing process and uniform softening resulting therefrom is harder to control the more strongly anisotropic the film is. Films of extruded bisphenol A polycarbonate, stretched polyethylene naphthalate (PEN) or polyethylene terephthalate (PET) tend to anisotropic deformation and the stretched films above all to severe shrinkage. However because of the lack of solubility of polyesters the production of cast films is not possible. Polyether sulfones (PES), polyether imides (PEI) and polyesters of bisphenol A with iso- and/or terephthalic acid or carbonic acid (that is bisphenol A polycarbonate) are only soluble in very environmentally harmful and toxic solvents such as methylene chloride or chloro-benzene. Hence not only is the production of membranes from such polymers in the cast film process disadvantageous, but also the membranes after their production still contain residues of such solvents. The membranes according to the invention can be produced by thermoplastic processes such as extrusion or calendering. In an embodiment as a calendered film, the membrane according to the invention is less anisotropic than in an embodiment as an extruded film. For this reason, the calendering process is preferred over the extrusion process. Particularly preferred is the cast film process, wherein the polymer is dissolved in a solvent, then spread over a ribbon of metal, a coated paper or a film and then dried. This process not only advantageously creates an isotropic membrane, but it is also possible to produce this much thinner than is possible with a thermoplastic process, i.e. for example in the thickness range from 5 to 20 μm, which as stated above is advantageous. Also for this reason, the problem was to find a polymer for such a membrane which is soluble in a less harmful solvent than a halogen-containing solvent. Other important requirements for membranes for acoustic applications are deep-drawing quality, high elastic modulus, good water resistance and high thermal stability. The latter can be characterized by the glass transition temperature, Vicat softening point (ISO 306 at 50 N and 120 K/hr) or heat distortion temperature HDT Af (ISO 75-1, -2 at 1.8 MPa). The thickness of the film for the membrane is determined in accordance with DIN 53370.

BACKGROUND OF THE INVENTION

The purpose of the invention was to provide films for the production of membranes for acoustic applications which have a high elastic modulus and a high heat distortion temperature and also as far as possible consist of a polymer which is soluble in a halogen-free solvent. In addition, these membranes should exhibit good speech intelligibility and enable the reproduction of music in good quality and adequate volume and exhibit high mechanical stability at high temperature.

SUMMARY OF THE INVENTION

Surprisingly, it has been found that membranes of special films exhibit markedly better acoustic properties than membranes which were produced from extruded bisphenol A polycarbonate or polyester films. Such special films are those, in particular from the cast film process, made of a polyester containing the structural unit of the formula (I)

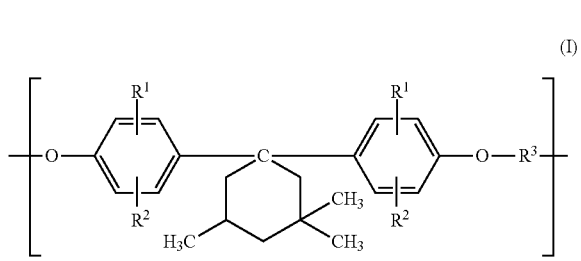

(I)

wherein $R^1$ and $R^2$ independently of each other represent halogen, C1-C8 alkyl, C5-C6 cycloalkyl, C6-C10 aryl, C7-C12 aralkyl or preferably hydrogen and $R^3$ either corresponds to the following formula (A) or preferably is a carbonyl group.

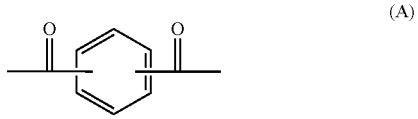

(A)

Even compared to bisphenol A polycarbonate from the cast film process, significant advantages are obtained. Through the use of a special bisphenol, as can be seen from formula (I), an aromatic polyester with a solubility in halogen-free solvents can be obtained. Because of their less favorable properties, normal polycarbonates from bisphenol A (PC) or aromatic polyesters (AP) from tere- and isophthalic acid and bisphenol A are not according to the invention.

DETAILED DESCRIPTION

As well as the structural unit (I), a further structural unit can be contained. Preferably the polyester contains the structural unit (I) and the structural unit with the formula (II):

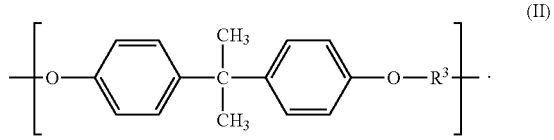

(II)

While PC and AP based on bisphenol A have to be dissolved in methylene chloride or chlorobenzene, the polyesters according to the invention are for example soluble in acetone, toluene and tetrahydrofuran, provided that the proportion of the structural unit (I) based on the structural units (I) and (II) amounts to at least 60 weight %. A low content of bisphenol A avoids film brittleness. Hence the membrane preferably contains a polyester with 60 to 90 weight %, particularly preferably 65 to 85 weight %, of the structural unit (I) and 10 to 40 weight %, particularly preferably 15 to 35 weight %, of the structural unit (II). The good solubility in halogen-free solvents hence makes it possible to produce shrink-free and isotropic films for deep-drawn membranes and at the same time to create particularly thin membranes. Both advantages have a favorable effect on the acoustic properties. The polyester according to the invention which is contained in film or membrane according to the invention preferably has a bending modulus of at least 2350 MPa and/or preferably a yield stress of at least 75 MPa. The heat distortion temperature HDT Af of the polyester is preferably at least 173° C., particularly preferably at least 180° C., and/or the Vicat softening point is preferably at least 203° C.

The improved thermal stability compared to polycarbonate from bisphenol A (PC) or aromatic polyester (AP) from tere- and isophthalic acid and bisphenol A also leads to higher thermal stability of the membranes. This means that the acoustic signal converter has less tendency to warp (reversal of formation of deep-drawn structure) in the heat. Surprisingly, the lifetime under normal conditions is also increased. Presumably the membranes according to the invention have less tendency to "go baggy" which impairs the sound quality. Possibly this is due to the better mechanical properties such as bending modulus or yield stress. Thinner membranes have less strength and resistance to deformation than thick ones, which in the membranes according to the invention can be compensated by the higher bending modulus. Aromatic polyesters from tere- and isophthalic acid and bisphenol A exhibit a tendency to crystallization, hence aggregates form in solutions. These lead to ever-increasing viscosities and hence to deviations in the coating process, which leads to unstable film quality. The problem can be solved through the addition of surfactants, but this is in exchange for the disadvantages of poorer adhesion and moisture sensitivity. Surprisingly, solutions of the polyester according to the invention are stable. The polyester according to the invention combines the advantages of PC (viscosity stability) and AP (modulus and thermal stability).

| | Glass transition temperature [° C.] | Heat distortion temperature [° C.] | Vicat softening point [° C.] |
|---|---|---|---|
| Acc. to invention | up to 239 | 173-187 | 203-218 |
| PC | 135 | 123-130 | 138-145 |
| AP | 188 | 174 | 195 |

| | Bending modulus [MPa] | Yield stress [MPa] | Viscosity stability of solutions |
|---|---|---|---|
| Acc. to invention | 2400 | 76-78 | yes |
| PC | 2300 | 61-67 | yes |
| AP | 2100 | 69 | no |

Polymers as contained in the membranes according to the invention are distinguished by high transparency, thermal stability, refractive index and toughness and were until now used exclusively for optical applications such as automobile lamp housing or light covers in household appliances and in medical technology such as syringe attachments or sterilizable transparent vessels. Until now, these products have been produced exclusively by thermoplastic processing and not by a solvent process such as cast film technology.

Further, it has been found that the membranes according to the invention exhibit a high damping factor and essentially linear acoustic properties over a large frequency and volume range and can therefore be used directly for acoustic applications. They exhibit outstanding transient response and attenuation behavior, and uniform oscillation behavior over a large frequency and volume range and enable good speech intelligibility. Owing to their excellent damping properties ("internal loss"), the membranes according to the invention are particularly suitable for the production of deep-drawn membranes as sound converters for acoustic applications, preferably as microphone and/or loudspeaker membranes. They exhibit less "metallic" tone than known membranes made of other polymers. They are particularly suitable in case of high requirements for speech intelligibility, such as for example during use as microphone and loudspeaker membranes in microphone capsules, mobile telephones, hands-free speech units, radio equipment, hearing aids, headphones, miniature radios, computers and PDAs or as signal transmitters.

For the deep-drawing of the film to the membrane this must be heated. Preferably the heating is effected by an infrared lamp. Hence the film preferably contains a dye, a pigment or an IR absorber. Examples of these are organic dyes such as CAS No. 4702-90-3, carbon black, such as toner or IR absorbers such as SDA 7257 (H.W. Sands Corp.), vanadyl 5,14,23,32-tetraphenyl-2,3-naphthalocyanine, copper(II) 1,4,8,11,15,18,22,25-octabutoxy-29H,31H-phthalocyanine and ITO (indium-tin oxide, e.g. ITO containing more than 94% indium oxide from Nanogate Co.). Preferably an additive which exhibits an absorption in the range from 0.75 to 4.0 µm, particularly preferably in the range from 1.0 to 2.0 µm, is contained in the film.

The finished shaped membranes can then be cut out from the film by means of a mechanical process, for example with a knife or a punch, or contactless, for example by means of a water jet or a laser. Preferably, the shaped membranes are punched out or cut with a laser. Next, the membranes can be bonded at the outer circumference with a support ring of plastic or metal and with a coil with connector contacts and incorporated as a microphone or loudspeaker membrane together with a permanent magnet in appropriate devices for the conversion or generation of acoustic signals.

For the avoidance of dust deposition, the film preferably also contains an antistatic agent such as glycerin monostearate, cetyltrimethylammonium bromide or a nonionic or anionic surfactant.

Further additives are those which are commonly used for the production of films, such as for example antioxidants, lubricants, light stabilizers or antihydrolysis agents.

For the production of cast films according to the invention, the solutions, which preferably have a solids content of 10 to 40%, particularly preferably 15 to 25%, are applied onto a support for example with a feeder head, a nozzle, a doctor knife, or a gravure cylinder and dried in one or more stages. The film according to the invention can then be stripped off. In another embodiment, before the stripping, other layers such as for example lacquer, laminating adhesives or adhesive tape are applied. As supports, for example rollers and endless bands of metal, siliconized paper or films are suitable, and preferably non-siliconized biaxially stretched polypropylene and polyester films, particularly preferably of polyethylene terephthalate. The use of such a biaxially stretched polypropylene or polyester film yields a defect-free coating pattern and the adhesion of the film according to the invention on this support material is high enough that the film according to the invention is strengthened for further process steps or transport/storage. In addition, the adhesion is also not too high, so that the film can be stripped off with no problems at the desired time. The film also protects the film according to the invention from contamination and mechanical damage. The film is preferably matt on at least one side so that it can more easily be rolled up and unrolled. The matt effect can be attained by a matt surface of the support or the addition of a matting agent (e.g. polyolefin balls).

Thicker films (beyond 20, in particular 40 µm) can be more simply produced by extrusion such as in the flat film process or calendering process. Before rolling, the film is preferably shrink-relieved on a number of annealing rollers, in order to eliminate tensions and anisotropy of the properties. Shrink-relief can also be attained by storage of the film in an oven. In this case, the film should previously be covered with a separating paper, a separating film or another film in order to avoid blocking.

The following examples are to illustrate the invention without wishing to limit it.

EXAMPLE 1

A polyester with 69 weight % of structural element (I) and 31 weight % of structural element (II) is used.
Properties:
Vicat softening point 203° C. (ISO 306, 50 N, 120 K/min), bending modulus 2400 MPa (ISO 178, 2 mm/min), yield stress 76 MPa (ISO 527-1 and 2, 50 mm/min), yield strain 6.9% (ISO 527-1 and 2, 50 mm/min), melt mass flow rate 8 g/10 min (MVR, ISO 1133, 330° C., 2.16 kg), heat distortion temperature HDT, Af 173° C. (ISO 75-1 and 2 at 1.8 MPa).

100 g of this polyester are dissolved in 400 g of dry tetrahydrofuran at room temperature with stirring. Further, 0.01 g of glycerin monostearate and 0.001 g of copper(II) 1,4,8, 11,15,18,22,25-octabutoxy-29H,31H-phthalocyanine are added. The solution is coated onto a 23 µm thick biaxially stretched polyethylene terephthalate film with a "knife over roll" and then dried. The adhesive tape tesa 4389 (12 µm polyester film, coated on each side with 9 g/m² of a solvent acrylate adhesive composition and covered on one side with a liner) is laminated onto the 10 µm thick polymer layer. A further polymer layer according to the invention is laminated onto this composite on the adhesive side so that the following structure is obtained:

polyethylene terephthalate 23 µm
polyester film according to the invention 10 µm
acrylate composition 8 µm
polyethylene terephthalate 12 µm
acrylate composition 8 µm
polyester film according to the invention 10 µm Before the deep drawing and punching out, the 23 µm thick polyester film is stripped off.

EXAMPLE 2

A polyester with 83 weight % of structural element (I) and 17 weight % of structural element (II) is used.
Properties:
Vicat softening point 218° C., bending modulus 2400 MPa, yield stress 78 MPa, yield strain 6.9%, melt mass flow rate 5 g/10 min, heat distortion temperature HDT, Af 187° C.

The polymer is treated with 0.05 weight % of a color batch (carbon black in standard polycarbonate) and processed to a film with a thickness of 25 µm on a flat film plant (nozzle temperature 280° C., chill roll temperature 150° C.). The film is then shrink-relieved at 150° C.

Comparative Example 1

A polycarbonate with the following properties is used:
Vicat softening point 145° C., bending modulus 2300 MPa, yield stress 66 MPa, yield strain 6.1%, melt mass flow rate 11 g/10 min (MVR, ISO 1133, 300° C., 1.2 kg), heat distortion temperature HDT, Af 125° C.

It is dissolved in methylene chloride and without addition of further additives is processed into a 10 µm thick film and then to the composite with adhesive tape analogously to Example 1.

Comparative Example 2

Without addition of a color batch, the polycarbonate from comparative example 1 is processed into a film with a thickness of 25 µm on a flat film plant (nozzle temperature 260° C., chill roll temperature 130° C.) and not shrink-relieved.

Comparative Example 3

A polyester of bisphenol A with equal proportions of iso- and terephthalic acid with the following properties is used:
Vicat softening point 195° C., bending modulus 2100 MPa, yield stress 69 MPa, yield strain 60%, heat distortion temperature HDT, Af 175° C.

It is dissolved in methylene chloride and without addition of further additives is processed into a 10 μm thick film and then to the composite with adhesive tape analogously to Example 1. Because of increasing solution viscosity, the film thickness does not remain constant during manufacture.

Assessment of the Films Produced

With the exception of that from example 1, the films are rapidly contaminated on the surface by dust. The films are heated with an infrared lamp. The films from examples 1 and 2 rapidly heat up and with those from the comparative examples supplementary use of hot air was necessary in order to reach a sufficiently high temperature for the deep-drawing. The finished shaped membranes are cut out to 13 mm diameter with a punch and bonded on the outer diameter with the support ring and with a coil with connection terminals. Together with permanent magnets, loudspeakers are thus produced. These are subjected to a durability test based on DIN ETS 300019. Under load, the loudspeakers are subjected to various tests such as for example multiple exposure to temperature cycles (−40° C. to 85° C.) at high atmospheric humidity or continuous exposure to 85° C. Each loudspeaker is loaded with an electrical loading with "pink noise" at the nominal capacity of the loudspeaker for 500 hours. At the beginning and end of the 500 hours, the sound quality is subjectively assessed:

| Sound quality of the membrane from | 0 hours | 500 hours |
| --- | --- | --- |
| Example 1 | 1 | 1 |
| Example 2 | 1 | 1 |
| Comparative example 1 | 1 | 3 |
| Comparative example 2 | 2 | 3 |
| Comparative example 3 | 1 | 1 |

1 very good,
2 with limitations,
3 failed.

The invention claimed is:

1. A deep-drawn membrane formed of a polyester or polycarbonate film, wherein the polyester comprises a structural unit of the formula (I),

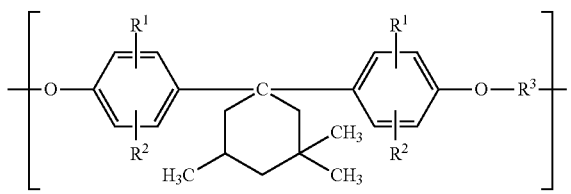

and a structural unit of the formula (II)

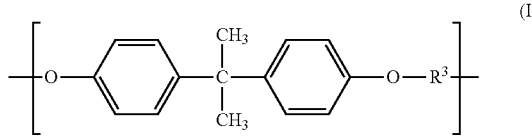

wherein $R^1$ and $R^2$ independently of each other represent halogen, C1-C8 alkyl, C5-C6 cycloalkyl, C6-C10 aryl, C7-C12 aralkyl or hydrogen and $R^3$ corresponds to the following formula (A)

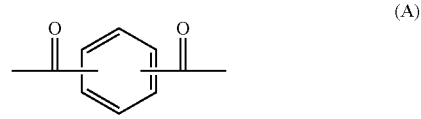

or wherein the polycarbonate comprises a structural unit of the formula (I),

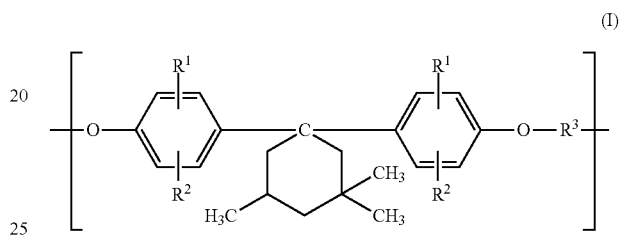

and a structural unit of the formula (II)

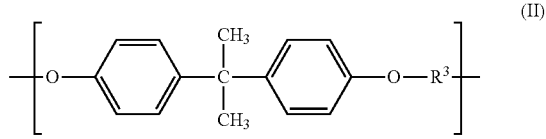

wherein $R^1$ and $R^2$ independently of each other represent halogen, C1-C8 alkyl, C5-C6 cycloalkyl, C6-C10 aryl, C7-C12 aralkyl or hydrogen and $R^3$ corresponds to a carbonyl group and the deep-drawn membrane is used for acoustic signal converters.

2. The deep-drawn membrane of claim 1, comprising a dye, a pigment, an IR absorber or an antistatic agent.

3. The deep-drawn membrane of claim 1, wherein the polyester or polycarbonate is dissolved in a solvent, and as a cast film on a support, optionally a stretched polyester film, processed into a cast film.

4. The deep-drawn membrane of claim 1, wherein the polyester or polycarbonate is processed into a film in the extrusion or calendering process and then optionally shrink-relieved by the action of heat.

5. The deep-drawn membrane of claim 1, wherein the polyester or polycarbonate comprises 60 to 90 weight % of the structural unit (I) and 10 to 40 weight % of the structural unit (II).

6. The deep-drawn membrane of claim 1, wherein the polyester or polycarbonate has a bending modulus of at least 2350 MPa and/or a yield stress of at least 75 MPa.

7. The deep-drawn membrane of claim 1, wherein the polyester or polycarbonate has a heat distortion temperature HDT Af of at least 173° C. and/or a Vicat softening point of at least 203° C.

8. Microphone capsules, mobile telephones, hands-free speech units, radio equipment, hearing aids, headphones, miniature radios, computers, PDAs and/or signal transmitters comprising a deep-drawn membrane of claim 1.

9. Acoustic signal converters, comprising the deep-drawn membrane of claim 1.

10. The deep-drawn membrane of claim 5, wherein the polyester or polycarbonate contains 65 to 85 weight % of the structural unit (I) and 15 to 35 weight % of the structural unit (II).

11. The deep-drawn membrane of claim 7, wherein said heat distortion temperature HDT Af is at least 180° C.

* * * * *